United States Patent [19]
Baird et al.

[11] Patent Number: 5,207,897
[45] Date of Patent: May 4, 1993

[54] FLOATING HYDROCARBONS SEPARATOR PUMP WITH BUOYANT HOUSING AND TWO-CHAMBER VERTICALLY MOVEABLE MEMBER

[76] Inventors: William E. Baird, 55 Red Gate La., Cohasset, Mass. 02025; Peter J. Tolan, 30 Greenfield La., Scituate, Mass. 02066

[21] Appl. No.: 702,752

[22] Filed: May 20, 1991

[51] Int. Cl.⁵ ............................................. C02F 1/40
[52] U.S. Cl. .................................... 210/109; 166/53; 166/265; 210/141; 210/148; 210/242.3; 417/37; 417/61; 417/120
[58] Field of Search ................. 166/53, 265; 210/109, 210/170, 242.1, 242.3, 747, 923, 148, 141; 417/36, 37, 61, 118, 120, 126, 404, 117, 136

[56] References Cited

U.S. PATENT DOCUMENTS

| | | | |
|---|---|---|---|
| 3,667,610 | 6/1972 | Daniel | 210/242.3 |
| 4,273,650 | 6/1981 | Solomon | 210/923 |
| 4,404,093 | 9/1983 | Moyer | 210/923 |
| 4,469,170 | 9/1984 | Farmer, Jr. | 210/923 |
| 4,527,633 | 7/1985 | McLaughlin et al. | 417/118 |
| 4,625,801 | 12/1986 | McLaughlin et al. | 166/53 |
| 4,625,807 | 12/1986 | Harlow | 210/923 |
| 4,663,037 | 5/1987 | Breslin | 210/170 |
| 4,746,423 | 5/1988 | Moyer | 210/923 |
| 4,761,225 | 8/1988 | Breslin | 210/923 |
| 4,934,458 | 6/1990 | Warburton et al. | 166/53 |
| 4,998,585 | 3/1991 | Newcomer et al. | 166/53 |

*Primary Examiner*—W. Gary Jones
*Assistant Examiner*—Joseph Drodge
*Attorney, Agent, or Firm*—Henry M. Bissell

[57] ABSTRACT

An automatic pumping system for removal of floating contaminants and oil and gasoline seepage from water wells. A vertically reciprocating cone-shaped member, like an inverted funnel, is moved between positions above and below the water surface. As it submerges, the inverted funnel collects the floating product within its circumference and transfers it to a collection space surrounding the cone. In the upper position, this collection space is sealed so that air may be blown into it while the collected product is driven out through a pickup tube to a collection sump for ultimate disposal. A second embodiment incorporates a hydraulic pumping system which operates in synchronism with the contamination collection and disposal system to create a cone of depression which draws the floating product into the space covered by the circumference of the reciprocating cone.

25 Claims, 3 Drawing Sheets

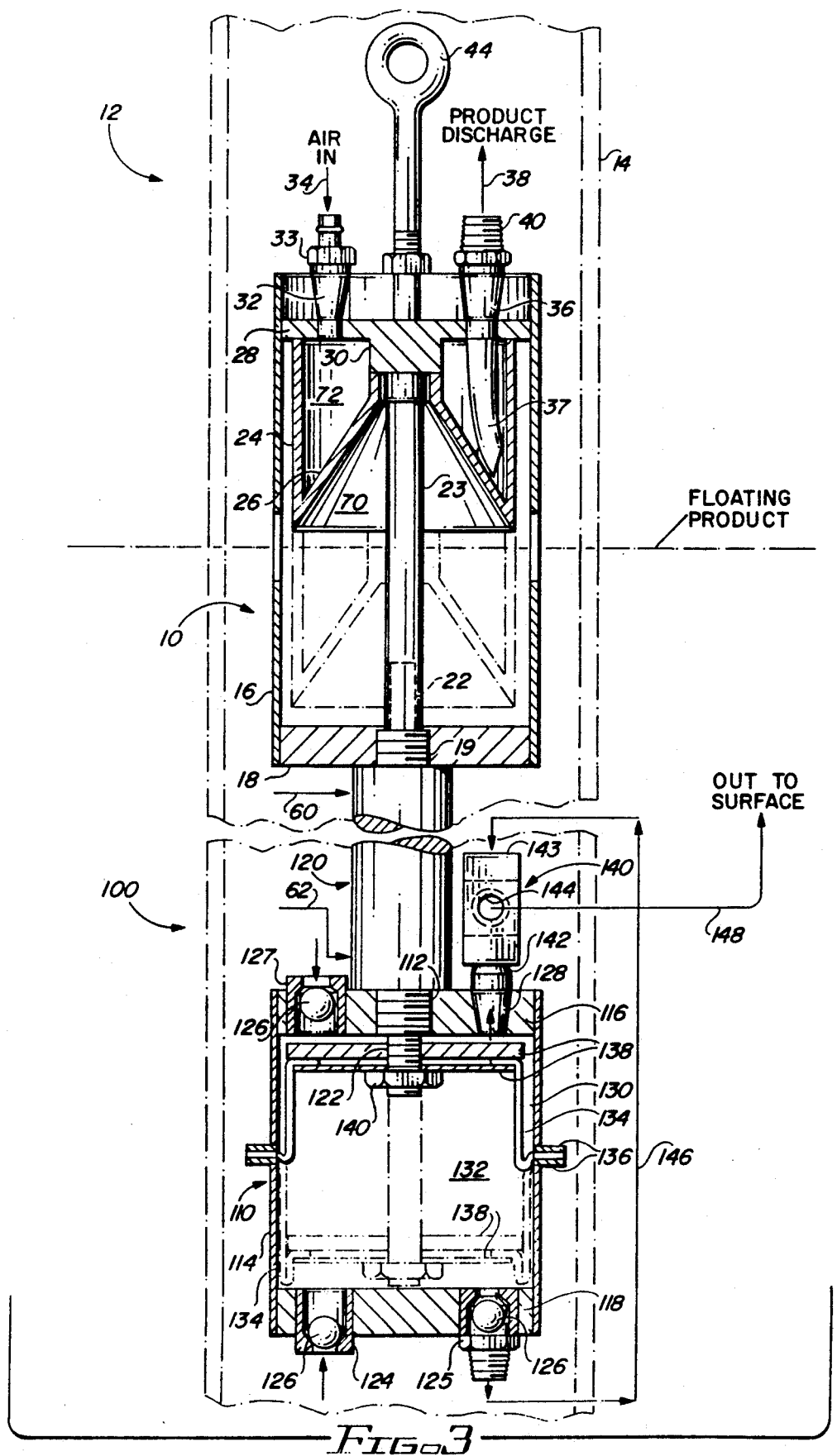

ns5,207,897

FLOATING HYDROCARBONS SEPARATOR PUMP WITH BUOYANT HOUSING AND TWO-CHAMBER VERTICALLY MOVEABLE MEMBER

BACKGROUND OF THE INVENTION

1. Field of the Invention

This invention relates to the recovery of liquid hydrocarbons (oil, gasoline and other petroleum products) which may be found underground floating on top of the water table or may be floating as a thin layer on the surface of lagoons and ponds. The liquid hydrocarbons are generally present in these locations, particularly floating on ground water, because of an unintentional oil spill or leakage from a storage tank or other facility.

2. Description of the Related Art

It is well known that the numerous and widely distributed facilities for the handling of oil and petroleum products, such as service stations, terminals, refineries, pipe lines, etc., inevitably produce (indeed, have produced on many occasions) accidental spills and leaks such that substantial quantities of liquid hydrocarbons are lost into the subsurface soil. In most cases, this liquid filters through the soil and finally accumulates on the water table where it remains as a contamination which must be removed. Equipment and methods used in handling surface spills are generally of no use in cleaning up subsurface contamination because of the greatly different parameters of the recovery problems which are involved.

One common method of underground liquid hydrocarbon recovery is to drill a well, typically 30 feet or more below the water table. By pumping water from the bottom of this well, a cone-shaped depression, commonly referred to as a cone of depression, is created on the water table with the well as the apex. The lighter weight floating hydrocarbon liquid then collects in the well where it is removed by a second pump which is located near the liquid surface in the well. Systems such as this are disclosed in Finch U.S. Pat. No. 3,901,811 and in Solomon U.S. Pat. No. 4,273,650. These patented systems deal with fixed position pumps which may be rendered ineffective in situations where the water table is not static such that the respective fluid interfaces, hydrocarbon/water and hydrocarbon/air, can be maintained in the necessary relationship to each other for the systems to operate properly.

In an attempt to deal with this kind of problem, floating pump systems have been devised. These systems rely on various kinds of skimmers to remove the thin layer of hydrocarbons floating on the water in the well. Systems of this type are disclosed in U.S. Pat. No. 4,469,170 of Farmer, Jr., U.S. Pat. Nos. 4,663,037 and 4,761,225 of Breslin, U.S. Pat. Nos. 4,404,093 and 4,746,423 of Moyer and U.S. Pat. No. 4,527,633 of McLaughlin et al.

While the skimmer systems of these prior patents would be effective under particular conditions establishing the parameters for which they have been particularly designed, the devices of this type are frequently very inefficient and often require the transfer of large volumes of water with very small volumes of the contaminating liquid hydrocarbon product.

We have developed an improved system which somewhat resembles a floating well skimmer but differs therefrom in that it captures the volume of the floating product and transfers it into a controlled reservoir, from which it is positively pumped for removal.

SUMMARY OF THE INVENTION

In brief, particular arrangements in accordance with the present invention comprise a floating apparatus for installation within a perforated wall casing. The apparatus includes as its operative element a vertically reciprocating member in the shape of a right circular cylinder which is open at the top and closed by cone shape at the bottom, the closure being somewhat similar to an inverted funnel. A central shaft extends downwardly in the apex of the cone and is attached to the reciprocating rod of a pneumatic piston and cylinder combination. The reciprocating member is installed within a cylindrical housing of slightly larger diameter than the reciprocating member. Installed near the upper end of this housing is a transverse seal member which has a configuration such that it provides sealing surfaces for both the open upper wall of the right circular cylinder and a transversely flat end portion at the apex of the cone shape. A plurality of small holes extend from the inside of the cone shape through this exterior flattened apex portion.

The apparatus is provided with a buoyancy collar below the cylindrical housing and may have a stabilizing weight hanging from the bottom of the apparatus if needed.

The weight of the system and the buoyancy provided b the buoyancy collar are adjusted such that the cylindrical housing is partially submerged in the liquid within the well casing. At the proper operating level of partial submersion, the reciprocating member is moved between a position where it is above the surface of the water bearing the floating contaminating product thereon and a position where the apex of the cone is approximately at, or slightly below, the level of the liquid surface but with the upper wall of the right circular cylinder remaining above the liquid surface. This motion results in floating product being trapped by the cone, then forced through the holes to the space surrounding the cone within the cylinder. From there it is driven out through a discharge tube by positive air pressure when the cylinder is sealed against the transverse seal member.

In a second embodiment of the present invention, a hydraulic pump is attached to the lower end of the air cylinder to provide an additional pumping action to remove water from the well, taken from a point well below the liquid surface. This has the added advantage of developing a slight cone of depression which serves to draw the floating contaminants into the well casing where they are trapped by the reciprocating member and removed as described above.

BRIEF DESCRIPTION OF THE DRAWINGS

A better understanding of the present invention may be realized from a consideration of the following description, taken in conjunction with the accompanying drawings in which:

FIG. 3 is a schematic elevational view, in partial section, of another embodiment of the present invention.

DESCRIPTION OF THE PREFERRED EMBODIMENTS

Figure 1:
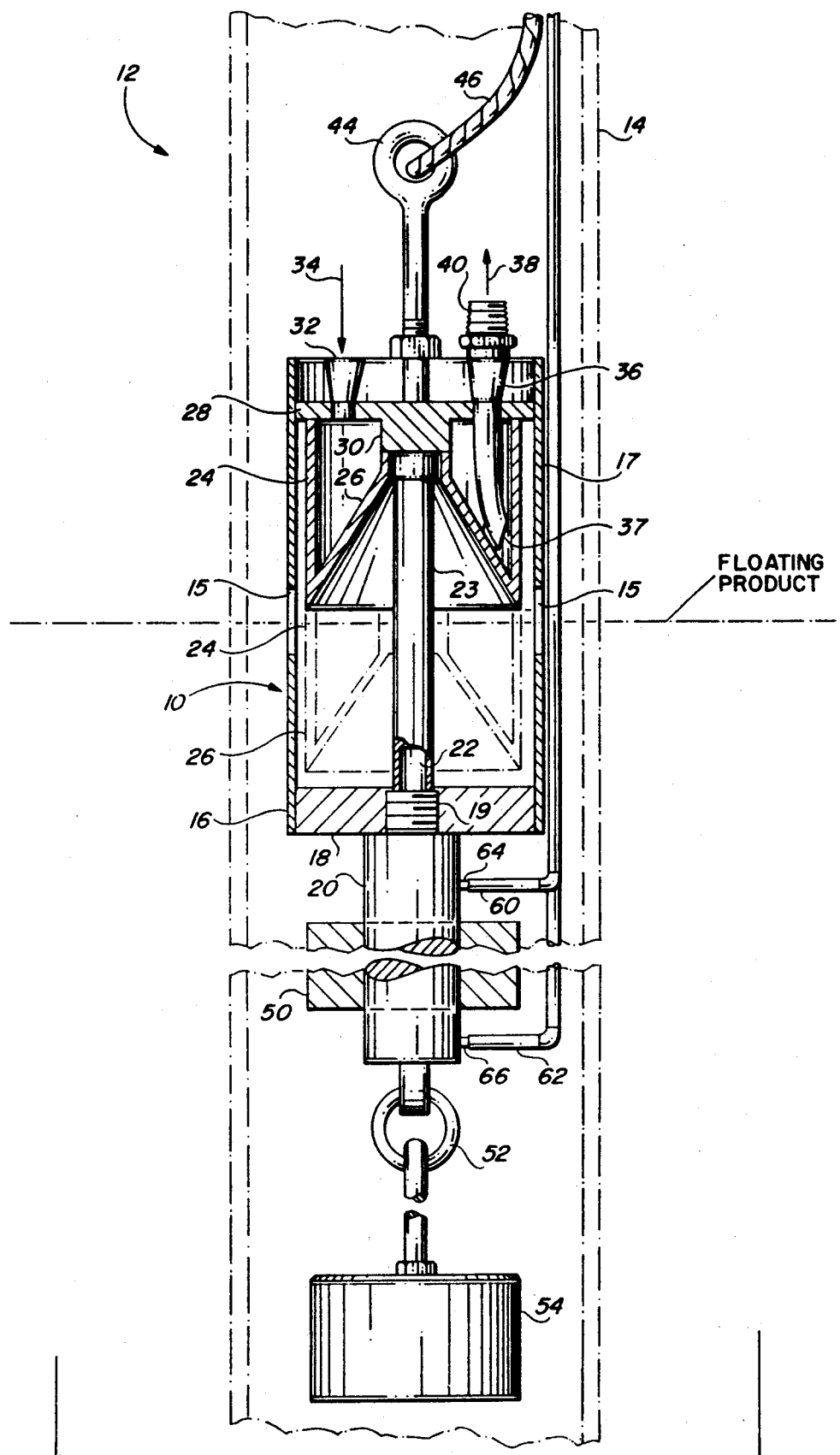
FIG. 1 is a schematic elevational view, in partial section, of one particular arrangement in accordance with the present invention.

FIG. 1 represents in schematic form a sectional elevational view of one particular embodiment of the invention. In this view, a floating pumping system 10 is shown installed within a groundwater recovery well 12. The well includes a slotted casing 14 which allows the free flow of groundwater and floating product into the well 12. The system 10 comprises a main, body 16 in the form of a hollow cylinder 17 which has a diametrical plug 18 at its lower end. The cylinder 17 has side openings 15 bridging the water surface which allow water and floating product into the cylinder 17. An air cylinder 20 operating as a linear actuator is mounted to the plug 18 by a threaded coupling 19. The cylinder 20 has a movable rod 22, to which is attached a right circular cylindrical member 24 which is open at the top and closed at the bottom by a cone-shaped portion 26. This may perhaps be better seen in the schematic view of FIG. 2. In the view of FIG. 1, the rod 22 is shown in the retracted position.

Within the upper portion of the body 16 is a transverse sealing plate 28 which closes off the upper open end of the body 16. This plate 28 provides a sealing surface for the upper end wall of the cylindrical member 24 and also has a central sealing portion 30 for mating with the upper end of the cone-shaped element 26. The sealing plate 28 has an inlet port 32 for the attachment of an air inlet tube 34 and an exit port 36 for the attachment of a floating product tube 38 through which captured floating product is driven to exit the system 10. The discharge tube 38 extends to a holding tank or reservoir (not shown) which may be emptied periodically as needed for disposal of the contamination product. Mounted in the exit port 36 is a check valve 40 to prevent any reentry of floating product which is forced out through the tube 38. The system is provided with a suspension link 44 to which a cable 46 is connected.

At the lower end, mounted on the air cylinder 20, is a buoyancy collar 50. Mounted to the lower end of the cylinder 20 is another link 52 from which a weight 54 is suspended. Air tubes 60, 62 are connected to ports 64, 66 in the air cylinder 20 to control the actuation of the air cylinder 20. A pickup tube 37 extends downwardly from the exit port 36 into the space around the periphery of the cone 26 where the floating product/effluent which has been captured by the cone 26 is gathered before being driven out of the system.

The cylinder 24 with its cone-shaped bottom 26 is shown in two different positions in FIG. 1 corresponding to the upper and lower limits of travel for this element. The lower position is indicated in phantom outline.

Figure 2:
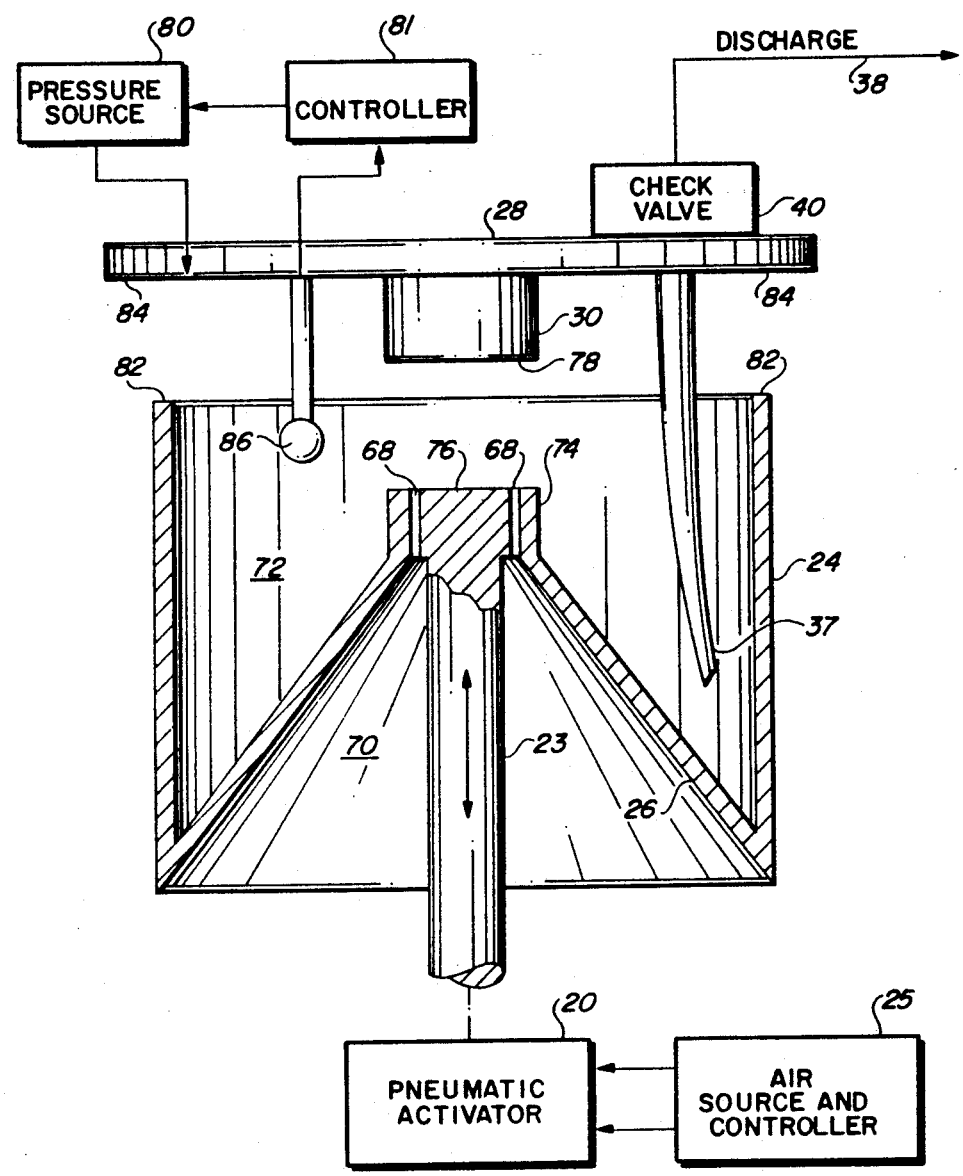
FIG. 2 is a schematic diagram showing the operative elements of FIG. 1 in better form for understanding the invention.

The operation of the system 10 of FIG. 1 may be explained in conjunction with the schematic diagram of FIG. 2, wherein the cylinder 24 with its cone-shaped bottom 26 is shown between the upper and lower limit positions depicted in FIG. 1. Referring to FIG. 2, the cone-shaped bottom 26 may be viewed as an inverted funnel having a central, downwardly extending shaft 23 which is attached to the movable rod of the pneumatic actuator 20. At the upper end of the inverted funnel 26 is a plurality of apertures or small ports 68 which communicate between the inner space 70 of the inverted funnel (cone-shaped bottom 26) and the collection space 72 outside the bottom 26. The ports 68 extend through a portion 74 which is provided with a sealing surface 76 shaped to mate with a corresponding sealing surface 78 on the sealing member 30. An air source and controller stage 25 is coupled to control the pneumatic actuator 20. Similarly, a pressure source 80 with controller 81 is connected to the inlet port of the transverse sealing plate 28 to control the removal of collected floating product from the system.

As the cylinder 24 is driven toward its lowermost position by the pneumatic actuator 20, it submerges through the surface of the groundwater in the well 12, at the same time trapping any floating product which is floating on the surface within the area encompassed by the cylinder 24. As the cylinder 24 moves below the surface, the trapped floating product is driven upwardly through the apertures 68, being forced from the space 70 into the space 72. The force which drives the floating product from the space 70 to the space 72 is the head pressure of the groundwater above the exit plane of the cone 26. This collected product is now contained within the right cylinder 24 in the space 72 outside the cone 26.

The cylinder 24 is now driven to its uppermost position by the pneumatic actuator 20 where the surface 76 of the cone 26 is driven into sealing engagement with the surface 78 of the sealing member 30. At the same time, the upper end wall 82 of the cylinder 24 is driven into sealing engagement with the lower side 84 of the sealing plate 28. The pressure source 80 is then activated to drive air into the space 72 which is now sealed closed against the sealing plate 28 and protruding seal member 30. The increased air pressure within the space 72 drives the trapped floating product out through the pickup tube 37, the check valve 40 and discharge tube 38.

After a pre-set time in the upper position, the cylinder 24 is driven downwardly again by the pneumatic actuator 20 to begin a new cycle.

The discharge cycle, during which the pressure source 80 is actuated to drive air into the space 72 when that space is sealed closed in the uppermost position of the cylinder 24, may occur after every cycle of the cone being retracted and extended, if desired. However, many remedial sites have only a thin film of product floating on the groundwater, and the product discharge may only be required after several cycles of the cone 26 being retracted and extended. The controller 81 coupled to the pressure source 80 may accomplish this by use of a predetermined cycle counter or by any other appropriate means. For example, a sensor 86 may be suspended from the transverse plate 28 to detect collected product within the space 72 when it has reached a level where it should be discharged, thus triggering the controller 81 to actuate the pressure source 80 to pressurize the space 72.

FIG. 3 is a schematic, sectional view, similar to that of FIGS. 1 and 2, of a second particular arrangement in accordance with the present invention. The system 100 of FIG. 3 incorporates the body 16 and related components of the system 10 of FIGS. 1 and 2 in combination with a hydraulic pump 110 and a double acting linear actuator 120. Like elements of the arrangement of FIGS. 1 and 2 which are incorporated in the arrangement of FIG. 3 are designated by like reference numerals. The air cylinder 120 is essentially like the cylinder 20 of FIG. 1, except that it is double acting via a second drive rod 122 which protrudes out the lower end in line with the upper drive rod 22. The cylinder 120 is actuated by the air lines 60, 62 as in FIG. 3. The buoyancy collar 50 has been omitted for simplicity.

The hydraulic pump 110 is mounted to the air cylinder 120 and suspended therefrom by means of a threaded coupling 112. The hydraulic pump 110 comprises a cylinder 114 closed at the upper end by end plate 116 and at the lower end by end plate 118. Each of the end plates 116, 118 is provided with a pair of fluid ports extending therethrough to communicate with the adjacent inner portion of the pump. The cylinder 114 is divided into an upper space 130 and a lower space 132 by a rolling diaphragm 134 which is secured between flanges 136 about the wall of the cylinder 114 and held between a pair of piston plates 138 that are secured to the lower end of the rod 122 by means of a clamping nut 140. Thus, as the cylinder body 24 and cone 26 of the system 10 are driven between upper and lower positions by the air cylinder 120, the rolling diaphragm 134 between piston plates 138 at the end of rod 122 is driven in like fashion between upper and lower positions within the cylinder 114. As with the cylinder 24 and the cone 26, the lower position of the roller diaphragm 134 and associated parts is shown in phantom outline.

The lower end plate 118 of the cylinder 114 has an inlet port 124 and an outlet port 125, each including a check valve 126 to control the direction of flow therethrough. The upper end plate 116 is provided with an inlet port 127 and an outlet port 128. The inlet port 127 is provided with a check valve 126 to control the direction of water flow therethrough. A shuttle valve 140 is coupled to the exit port 128 of the upper plate 116 and acts as a check valve for the port 128 to permit the flow of water through the exit port 128 in the outward direction only. The shuttle valve 140 is provided with inlet openings 142, 143 at the lower and upper ends thereof, respectively, and an outlet opening 144 in the middle. Depending upon operating pressures at the inlet openings 142, 143, the shuttle valve alternatively provides a communicating passage from one or the other of the inlet ports 142, 143 to the outlet port 144. A tube 146 connects the exit port 125 in the lower end plate 118 with the inlet opening 143 of the shuttle valve 140. Another tube 148 connects the outlet port 144 with a collection reservoir above the groundwater surface, preferably outside of well 12.

The hydraulic pump 110 operates as follows in conjunction with the operation of the floating product collection system 10. As the rod 22/122 moves downwardly, driven by the actuator cylinder 120, the rolling diaphragm 134 compresses the space 132 and expands the space 130. As the space 130 expands, water is sucked in through the now-open check valve 126 in the inlet port 127 in the upper end plate 116. At this point, the shuttle valve 140 is in a position which blocks flow through the port 128. Compression of the space 132 forces the check valve 126 in the port 124 closed and drives water which is collected within the space 132 outwardly through the port 125, through the tube 146 to the inlet port 143 of the shuttle valve 140. At this point, the shuttle valve is in the position to provide a passage between the inlet port 143 and the outlet port 144 so that water is driven outwardly to the surface through tube 148 from the lower chamber 132 in the hydraulic pump 110.

On the upward stroke of the air cylinder shaft 22/122, water is now driven out of the upper chamber 130 through the exit port 128 and a now-open passage within the shuttle valve 140 to the outlet port 144 where it exits through tube 148 to the surface. During this movement of the piston plates 138 and rolling diaphragm 134, the check valve 126 within the port 127 closes, as does the check valve 126 within the lower inlet port 125. At the same time the check valve 126 within the inlet port 124 of the lower end plate 118 opens so that water can be drawn into the expanding volume 132. The cycle is repeated for each up and down stroke of the rod 22/122. In this manner, water is pumped out of the well 12 as the floating product is collected and driven upwardly through the openings at the top of the cone 26 of the system 10, thereby creating the desired cone of depression so that water flows into the well 12, drawing the floating product with it for collection and removal by the system 10.

The preferred embodiments of the disclosed invention have been shown and described in the context of a recovery device for use in groundwater wells. However, systems in accordance with the present invention may also be used to recover product in other bodies of water contaminated with floating product such as, for example, barge berths, lagoons and sumps. This device can very readily be sized to accommodate various specific requirements. Systems in accordance with the present invention are simple in construction, economical to manufacture, and are provided in a rugged design to be essentially maintenance free for long periods of time. Although devices of the present invention may superficially resemble in-well pump skimmers of the prior art, it will be recognized the principle of positive collection and withdrawal of floating product from the surface of the groundwater or other water which is involved make the devices completely unlike conventional skimmers.

Although there have been described hereinabove various specific arrangements of a hydraulic separator pump in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention as defined in the annexed claims.

What is claimed is:

1. A hydraulic separator system for recovering floating hydrocarbons from a water surface comprising:
   a buoyant housing having an encompassing side wall with top and bottom closures, said side wall having at least one opening bridging the water surface for admitting surface water and floating product into said housing;
   a linear actuator mounted to said housing and having a vertically oriented actuator rod extending into the housing;
   means for coupling a vertically movable member situated within said housing to said actuator rod for vertical movement relative to said housing between an upper position above a surface and a lower position in which the member is partially submerged;
   said member, having a cylindrical side wall and closed at the bottom by an inwardly tapering wall extending upwardly within the side wall to a position below an upper end of the cylindrical side wall, said inwardly tapered end wall dividing said member into a first chamber above said end wall and a second chamber below said end wall;

means defining at least one opening extending through said inwardly tapering end wall to communicate between said chambers;

a sealing surface extending along said top closure within said housing and having a configuration shaped to seal the upper end of the cylindrical side wall and the at least one opening in said end wall when the member is in the upper position, thereby closing said first chamber;

means for pressurizing said first chamber when said member is in the upper position; and means including a pickup tube extending into said first chamber through said top closure for removing liquid collected in said first chamber upon pressurization thereof.

2. The system of claim 1 wherein both said buoyant housing and said member correspond to sections of right circular cylinders positioned coaxially with respect to one another and wherein said inwardly tapering end wall comprises a cone-shaped section extending upwardly to a truncated end portion having a plurality of openings extending therethrough.

3. The system of claim 2 wherein said top closure comprises a transverse sealing plate with said sealing surface on the underside thereof, said sealing surface having a circumferential portion for sealing engagement with the upper end of the cylindrical side wall of the vertically movable member and a central sealing portion protruding downward to sealingly engage a mating surface of said truncated end portion.

4. The system of claim 3 wherein said transverse sealing plate includes first means for coupling to a pressurized air source and second means for coupling to a discharge tube for transferring product removed from said first chamber.

5. The system of claim 4 wherein said linear actuator includes an air cylinder and contained piston means, further comprising a plurality of air tubes coupled to said cylinder on opposite sides of said piston means for alternatively: (1) driving said member toward said lower position while trapping floating product in the second chamber and forcing said trapped product up through said openings into said first chamber; and (2) driving said member to its upper position of sealing engagement with said sealing surface to permit pressurization of said first chamber.

6. The system of claim 5 further including means coupled to said housing for controlling the buoyancy thereof.

7. The system of claim 6 wherein said air cylinder extends downwardly below the buoyant housing and is mounted to said bottom closure.

8. The system of claim 7 wherein said buoyancy controlling means comprise a buoyancy collar extending about said air cylinder below the surface of the water.

9. The system of claim 8 wherein said buoyancy controlling means further include a weight member and means for suspending said weight member from the lower end of said cylinder.

10. The system of claim 1 wherein said coupling means includes a coaxial mounting shaft extending downwardly from the center of said cone-shaped end wall to engage the actuator rod.

11. The system of claim 10 wherein said shaft and said rod are threaded with mating respective male and female threads for coupling together.

12. The system of claim 1 further including a pressurized air source and controller coupled to said linear actuator to control the movement of said vertically movable member between said upper and lower positions.

13. The system of claim 1 wherein the pressurizing means include a pressure source and controller for selectively pressurizing said first chamber.

14. The system of claim 13 further including means coupled to said controller for sensing the proximity of said movable member to its upper position.

15. The system of claim 1 wherein said pickup tube is positioned so that its lower end extends into a pocket in said upper chamber formed along the juncture of said inwardly tapering end wall and said cylindrical side wall.

16. The system of claim 1 wherein said linear actuator rod extends below the lower end of the actuator to drive a hydraulic pump coupled thereto.

17. The system of claim 16 wherein said hydraulic pump is mounted to the lower end of said actuator and comprises a cylinder with piston means therein coupled to the lower end of the actuator rod for movement therewith.

18. The system of claim 17 wherein said hydraulic pump comprises a cylindrical side wall closed at opposite ends by upper and lower end plates.

19. The system of claim 18 wherein each of said upper and lower end plates defines a pair of ports therein for alternatively admitting water into the portion of the cylinder adjacent thereto and releasing water therefrom in accordance with the movement of the piston means within the cylinder.

20. The system of claim 19 wherein each of the admitting ports of said end plates includes a ball check valve for permitting the flow of water therethrough in one direction only.

21. The system of claim 20 further comprising a shuttle valve connected to the hydraulic pump to receive water from said releasing ports in alternation and direct it away from the pump.

22. The system of claim 21 wherein the releasing port of the lower end plate includes a ball check valve for permitting the flow of water therethrough in one direction only.

23. The system of claim 22 wherein said shuttle valve is coupled to the releasing port of the upper end plate and includes means for controlling the flow of water through said releasing port in one direction only.

24. The system of claim 17 wherein said piston means comprise a rolling diaphragm separating the cylinder into two compartments and means for constraining the rolling diaphragm to move with said piston means within limits of travel thereof.

25. A hydraulic separator system for recovering floating hydrocarbons from a water surface comprising:

a vertically movable member having a cylindrical side wall extending between top and bottom closures, said bottom closure including an inwardly tapering wall dividing said member into an upper and a lower chamber and defining a collection pocket in said upper chamber along and above the juncture of said inwardly tapering end wall with the cylindrical side wall;

a buoyant housing containing said member, said housing comprising an outer cylindrical wall and transverse end plates closing the upper and lower ends of said cylindrical wall, the upper end plate having along its underside means for sealing said upper chamber when the movable member is in an upper position;

means for driving the movable member from said upper position toward a lower position to trap floating product in said lower chamber as the movable member submerges;

means defining at least one opening extending through said inwardly tapering end wall in an upper portion thereof for transferring product trapped in the lower chamber into said upper chamber;

means for selectively pressurizing said upper chamber when the movable member is in the upper position bearing against said sealing means;

pickup means extending into said pocket for removing collected product from said upper chamber in response to the pressurization thereof; and means for activating the driving means and the pressurizing means in synchronism to repetitively move said movable member between said upper and lower positions to cyclically trap product in said lower chamber, transfer trapped product through said opening to said upper chamber, pick up collected product from said upper chamber and remove said product from the system.

* * * * *